US012765526B2

(12) United States Patent
Marshall, Jr.

(10) Patent No.: US 12,765,526 B2
(45) Date of Patent: Oct. 20, 2026

(54) FISHING LURE WITH BOTTOM DISPLACING WEIGHTED HEAD, INVERSE HOOK ORIENTATION, AND LURE BODY RETENTION FEATURE

(71) Applicant: Light Tackle Anglers, LLC, Canton, MA (US)

(72) Inventor: Charles W. Marshall, Jr., Canton, MA (US)

(73) Assignee: Light Tackle Anglers, LLC, Canton, MA (US)

( * ) Notice: Subject to any disclaimer, the term of this patent is extended or adjusted under 35 U.S.C. 154(b) by 0 days.

(21) Appl. No.: 19/252,263

(22) Filed: Jun. 27, 2025

(65) Prior Publication Data

US 2026/0053126 A1 Feb. 26, 2026

Related U.S. Application Data

(60) Provisional application No. 63/675,381, filed on Jul. 25, 2024.

(51) Int. Cl.
*A01K 85/00* (2006.01)

(52) U.S. Cl.
CPC ...... *A01K 85/1837* (2022.02); *A01K 85/1833* (2022.02)

(58) Field of Classification Search
CPC ............ A01K 85/1837; A01K 85/1833; A01K 85/1841; A01K 85/18; A01K 83/06; A01K 83/064; A01K 83/066
USPC ........................................................ 43/42.39
See application file for complete search history.

(56) References Cited

U.S. PATENT DOCUMENTS 310,118 A * 12/1884 Bower .................... A01K 83/00 43/43.16
973,246 A * 10/1910 Aagaard ................ A01K 85/12 43/44.6
979,891 A * 12/1910 Schield .................. A01K 83/06 43/44.2
1,246,150 A * 11/1917 Parr ........................ A01K 83/06 43/44.4
1,636,832 A * 7/1927 Pagin ...................... A01K 85/16 43/42.49
(Continued)

FOREIGN PATENT DOCUMENTS

DE 202020004580 U1 * 5/2022 ............. A01K 83/00
FR 3123181 A1 * 12/2022 ............. C22C 19/00
(Continued)

*Primary Examiner* — Morgan T Jordan
(74) *Attorney, Agent, or Firm* — Morse, Barnes-Brown & Pendleton, P.C.; Sean D. Detweiler, Esq.

(57) ABSTRACT

A fishing lure is disclosed, comprising a hook assembly with an eye, a first shank with a weighted head and an attachment feature, and a second shank with a barbed point directed away from the weighted head. The hook assembly is covered by a lure body attached to the attachment feature. The eye and barbed point extend beyond the lure body, enhancing the lure's effectiveness in attracting and catching fish. The weighted head provides a desired movement profile to the lure, while the orientation of the barbed point ensures secure hooking of the fish. This fishing lure design offers improved performance and durability for anglers seeking a reliable and efficient fishing tool.

11 Claims, 8 Drawing Sheets

(56) References Cited

U.S. PATENT DOCUMENTS 2,148,074 A * 2/1939 Kaspick ................ A01K 83/02 43/44.8
2,476,126 A * 7/1949 Weiss ................ A01K 83/06 43/44.2
2,565,956 A * 8/1951 Duhamel ................ A01K 83/06 43/44.4
2,573,018 A * 10/1951 Herrick ................ A01K 83/06 43/44.8
2,598,011 A * 5/1952 Pitre ................ A01K 83/06 43/44.4
2,651,133 A * 9/1953 Sharps ................ A01K 85/08 43/44.8
2,668,387 A * 2/1954 Gallardo ................ A01K 83/06 43/44.4
2,775,841 A * 1/1957 Baker ................ A01K 85/16 43/42.48
2,825,174 A * 3/1958 Leinonen ................ A01K 83/06 43/44.8
3,212,209 A * 10/1965 Irvin ................ A01K 85/00 D22/128
3,344,549 A * 10/1967 Peters ................ A01K 85/00 D22/127
3,500,576 A * 3/1970 Ostrom ................ A01K 95/00 43/42.49
3,803,747 A * 4/1974 Cartwright ................ A01K 85/00 43/44.81
3,834,060 A * 9/1974 Wagenknecht ................ A01K 83/06 43/44.8
3,946,513 A * 3/1976 Seliga ................ A01K 85/14 43/42.5
3,978,606 A * 9/1976 Riggs ................ A01K 85/00 43/44.8
4,219,956 A * 9/1980 Hedman ................ A01K 85/00 D22/127
4,251,942 A * 2/1981 Jacobus ................ A01K 83/06 43/44.8
4,334,381 A 6/1982 Carver et al.
4,367,607 A * 1/1983 Hedman ................ A01K 85/00 43/44.8
4,777,758 A * 10/1988 Phillips ................ A01K 85/02 43/43.2
4,858,367 A 8/1989 Rabideau
4,879,835 A * 11/1989 Sprayberry ................ A01K 85/00 43/44.89
4,907,364 A * 3/1990 Hedman ................ A01K 85/00 43/44.8
5,094,026 A * 3/1992 Correll ................ A01K 85/00 D22/128
5,105,575 A * 4/1992 Robertaccio ................ A01K 85/00 43/44.8
5,220,743 A * 6/1993 McClellan ................ A01K 85/00 43/42.38
5,386,661 A * 2/1995 Davis ................ A01K 83/06 43/44.8
D371,821 S * 7/1996 Hood ................ D22/128
5,537,775 A * 7/1996 Crumrine ................ A01K 85/00 43/42.38
5,579,600 A * 12/1996 Burns ................ A01K 91/04 43/43.16
5,630,289 A 5/1997 Dotson
5,855,089 A * 1/1999 Hockmeyer ................ A01K 83/06 43/42.43
5,890,317 A * 4/1999 Hollomon ................ A01K 85/00 43/42.31
5,899,015 A * 5/1999 Link ................ A01K 85/00 43/42.39
5,904,001 A 5/1999 Rabideau
6,058,643 A * 5/2000 Marusak ................ A01K 85/16 43/42.34
6,122,857 A * 9/2000 Rhoten ................ A01K 85/00 43/43.16
6,141,900 A * 11/2000 Rudolph ................ A01K 85/00 43/42.31
6,772,553 B2 * 8/2004 Phillips ................ A01K 85/02 43/44.8
6,898,894 B1 * 5/2005 Anderson ................ A01K 85/00 43/42.39
7,140,146 B2 * 11/2006 Gill ................ A01K 85/00 43/42.39
7,614,178 B2 * 11/2009 Hoyt ................ A01K 85/01 43/44.8
7,841,127 B1 * 11/2010 Nakamichi ................ A01K 83/06 43/44.8
9,185,891 B2 * 11/2015 Nakamichi ................ A01K 85/00
9,504,237 B2 * 11/2016 Culver ................ A01K 85/00
10,492,478 B1 * 12/2019 Parks ................ A01K 85/00
11,019,811 B2 * 6/2021 Partridge ................ A01K 85/16
12,201,098 B2 * 1/2025 Parks ................ A01K 83/06
12,396,446 B1 * 8/2025 Christensen ................ A01K 95/00
2008/0289244 A1 * 11/2008 Parks ................ A01K 85/00 43/42.3
2010/0175305 A1 * 7/2010 Heikkila ................ A01K 85/16 43/42.22
2012/0005946 A1 * 1/2012 Bennis ................ A01K 85/00 43/44.87
2016/0106081 A1 * 4/2016 Thorne ................ A01K 91/04 43/42.39
2022/0132820 A1 * 5/2022 Willey ................ A01K 95/00 43/42.39
2022/0151211 A1 * 5/2022 Cure ................ A01K 85/1833
2022/0217958 A1 * 7/2022 Olsen ................ A01K 85/1863
2022/0240492 A1 * 8/2022 Boldt ................ A01K 85/1833
2022/0378027 A1 * 12/2022 Kawasaki ................ A01K 85/16
2023/0107358 A1 * 4/2023 Trammell ................ A01K 85/18 43/42.08
2024/0324565 A1 * 10/2024 Jansen ................ A01K 85/1837
2025/0176514 A1 * 6/2025 Zula ................ A01K 85/1821

FOREIGN PATENT DOCUMENTS

KR 20080045619 A * 5/2008 ......... A01K 85/1837
KR 20140000661 U * 2/2014 ......... A01K 85/08
KR 102622676 B1 * 1/2024 ......... A01K 85/1833
WO WO-2013043144 A1 * 3/2013 ......... A01K 85/14
WO WO-2021161507 A1 * 8/2021 ......... A01K 85/10
WO WO-2024028177 A1 * 2/2024 ......... A01K 85/1833

* cited by examiner

FISHING LURE WITH BOTTOM DISPLACING WEIGHTED HEAD, INVERSE HOOK ORIENTATION, AND LURE BODY RETENTION FEATURE

CROSS-REFERENCE TO RELATED APPLICATION(S)

This application claims priority to, and the benefit of, co-pending U.S. Provisional Application No. 63/675,381, filed Jul. 25, 2024, for all subject matter common to both applications. The disclosure of said provisional application is hereby incorporated by reference in its entirety.

FIELD OF THE INVENTION

The present invention relates to fishing tackle. In particular, the present invention relates to a fishing lure having a weighted head coupled to a hook barb oriented 180 degrees from that of a traditional weighted head, and a locking feature designed to hold a molded soft plastic lure body in place, preventing the soft plastic lure body from becoming detached from the hook assembly.

BACKGROUND

In some instances, fishing lures have incorporated weighted heads on the shank to provide additional casting distance or to achieve a specific swimming action. However, the integration of weighted heads with traditional hook assemblies has presented challenges in maintaining the balance and stability of the lure during retrieval. Furthermore, the positioning of the barbed point on the shank relative to the weighted head has not always been optimized for effective hooking and retention of fish.

Generally, hooks or lures are weighted to have the bait or mimic the behavior of bottom-feeding live creatures. Typically, in conventional approaches, the weight is located in proximity to the eye of the hook or the head of the lure, causing the point and barbs of the hook or lure to invert from their traditional orientation when in use. When soft plastic lure bodies are used, the hook is typically just pushed through or otherwise embedded in the soft plastic body.

However, this conventional approach has some shortcomings. Weighting a hook or lure in this conventional manner results in the orientation of the point and barbs pointing downward, rather than upward, which reduces the hook's effectiveness in catching fish. Furthermore, the soft nature of soft plastic lure bodies and their method of attachment to the hook means they can be dislodged from the hook by contact with fish or debris in the water.

Traditional fishing lures typically consist of a hook assembly with a single shank extending from an eye, ending at a barbed point, and a lure body attached to the shank. The weight distribution in these conventional fishing lures has been primarily focused on the hook assembly itself, with the lure body serving mainly as a decorative or attractant element. The attachment of the lure body to the hook assembly has often been achieved through simple means, such as threading the lure body onto the shank or using a separate attachment feature. An example of this can be seen in FIG. 1.

SUMMARY

There is a need for an improved weighted lure that does not suffer from the issues of conventional weighted hooks and lures. The present invention is directed toward providing further solutions to address this need, while also possessing other desirable characteristics. Specifically, the present invention relates to an improved lure having a weighted head coupled to a hook barb oriented 180 degrees from that of a traditional weighted head, with a locking feature designed to hold a molded soft plastic body in place, thereby preventing the soft plastic body from becoming detached from the hook assembly. Soft plastic can be implemented in different ways, including but not limited to thermoplastic rubber (TPR).

In accordance with embodiments of the present invention, a fishing lure with a weighted head is provided. The fishing lure is made of a hook assembly and a lure body. The hook assembly includes an eye, a first shank extending from the eye, and a second shank extending from the eye perpendicular to the first shank. A weighted head is disposed on the first shank opposite the eye. An attachment feature is disposed on the first shank between the weighted head and the eye. A bend ending in a barbed point is disposed on the second shank opposite the eye, wherein the barbed point is directed away from the weighted head and toward the eye. The lure body is positioned over the hook assembly and attached to the attachment feature of the hook assembly. The eye and the bend ending in a barbed point of the hook assembly extend beyond the lure body.

The design of the present invention was developed to provide a novel and efficient soft plastic-bodied artificial bait, offering a more lifelike lure response that triggers a greater number of fish strikes. In many cases, the present invention will be used as a "jig" presentation while fishing. With jigging, the fishing rod utilized to draw the running line of the rod and reel is retrieved upward from the lake or sea bottom and subsequently returned to the bottom. The weighted head of the present invention addresses the limitation of previous devices in closely replicating the behavior and movement patterns of bottom-feeding live bait fish. The weighted head of the present invention includes unique structural improvements over previous approaches. A conical shape to the weighted head dramatically alters an artificial bait's movement pattern in the water and allows it to more precisely replicate live bait motion, thereby greatly improving the effectiveness and number of fish strikes achieved. The novel barb direction of the hook, being oriented in the direction of the running line retrieval, is designed to enhance the device's performance and significantly improve an angler's success when using it in the field. The nature of soft plastic fishing bodies designed to resemble worms, fish, crustaceans, etc., means that they tend to become unhooked from the traditional fishing hook or become damaged when encountering a fish strike. The novel attachment feature is disposed on the first hook shank and serves as a soft plastic lure body retention device. The openings in the attachment feature enable the molded soft plastic material to flow into the attachment feature, thereby improving the structural integrity of the molded body, hook, and weighted head assembly.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
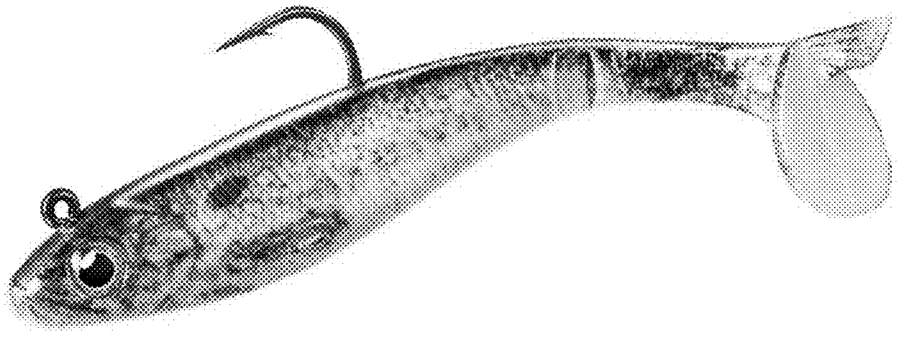
FIG. 1 PRIOR ART
FIG. 1 depicts a conventional lure.

An illustrative embodiment of the present invention relates to a fishing lure featuring a bottom-displacing weighted head, an inverse hook orientation, and a lure body retention feature. The weighted head of the lure dramatically alters an artificial bait's movement pattern in the water and allows the lure to more precisely replicate live bait motion, thereby greatly improving the effectiveness and number of fish strikes achieved. The novel barb direction of the hook, being oriented in the direction of the running line retrieval, is designed to enhance the device's performance and significantly improve an angler's success when using it in the field. The soft nature of lure bodies deigned to resemble worms, fish, crustaceans, etc., means that they tend to become unhooked from the traditional fishing hook or become damaged when encountering a fish strike. The attachment feature is disposed on the first shank and acts as a retention device. The openings in the attachment feature enable the molded soft plastic material of the lure body to flow into the attachment device, thereby improving the structural integrity of the molded body, hook, and weighted head assembly.

FIG. 2 through FIG. 8, wherein like parts are designated by like reference numerals throughout, illustrate an example embodiment or embodiments of a fishing lure with a bottom displacing weighted head, inverse hook orientation, and lure body retention feature, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 2:
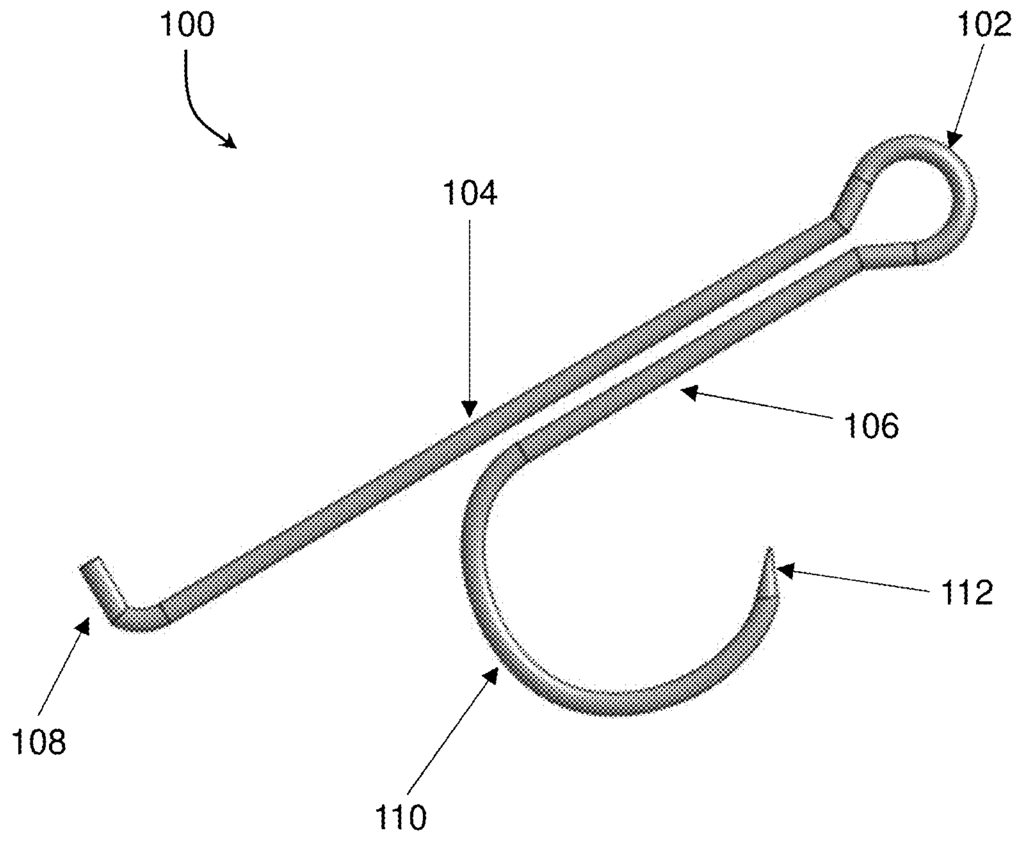
FIG. 2 depicts the hook assembly of the lure in accordance with embodiments of the present invention.

FIG. 2 is a side view of the hook assembly 100 of the lure 300 of the present invention. As shown here, the hook assembly comprises an eye 102, a first shank 104, and a second shank 106. The first shank 104 extends from the eye 102. The second shank 106 also extends from the eye 102 parallel to the first shank 104. In certain embodiments, a distal end of the first shank 104 opposite the eye 102 further comprises a "J" bend 108 for attaching a weighted head 114 to the first shank 104. A bend 110 ending in a barbed point 112 is disposed on the second shank 106 opposite the eye 102, wherein the barbed point 112 is directed toward the eye 102.

The eye 102, first shank 104, second shank 106, and bend 110 ending in a barbed point 112 can be formed of metal or composite material. In certain embodiments, the first shank 104, eye 102, second shank 106, and bend 110 ending in a barbed point 112 are formed as one piece. For example, a metal wire could be bent or otherwise shaped into the first shank 104 (including "J" bend 108 at the distal end), eye 102, second shank 106, and bend 110 ending in a barbed point 112. In other embodiments, the eye 102, first shank 104, second shank 106, and bend 110, ending in a barbed point 112, may be formed as separate pieces from different materials and combined to form the hook assembly 100. Other possible configurations will be apparent to one skilled in the art, given the benefit of this disclosure.

Figure 3:
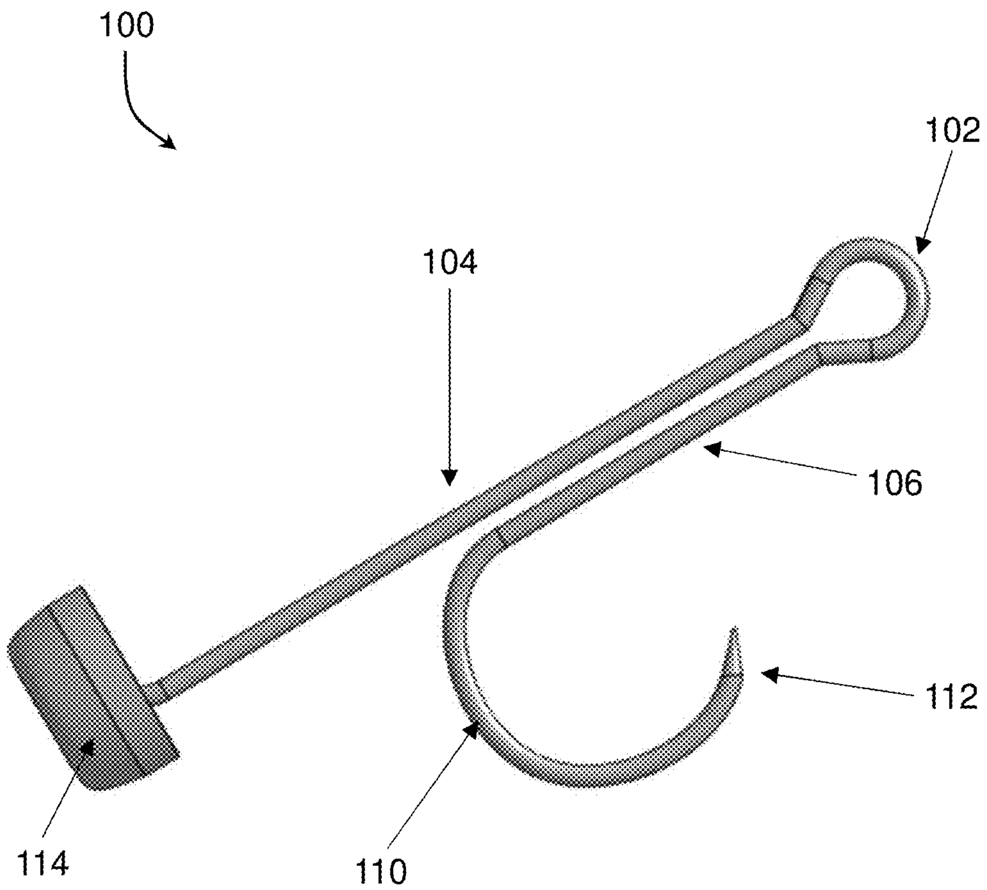
FIG. 3 depicts the hook assembly of the lure with a weighted head disposed thereon in accordance with embodiments of the present invention.

FIG. 3 shows a weighted head 114 disposed on the first shank 104 of the hook assembly 100 opposite the eye 102. In this embodiment, the weighted head 114 is formed onto, or otherwise secured to, the "J" bend 108 at the distal end of the first shank 104 opposite the eye 102.

Figure 4:
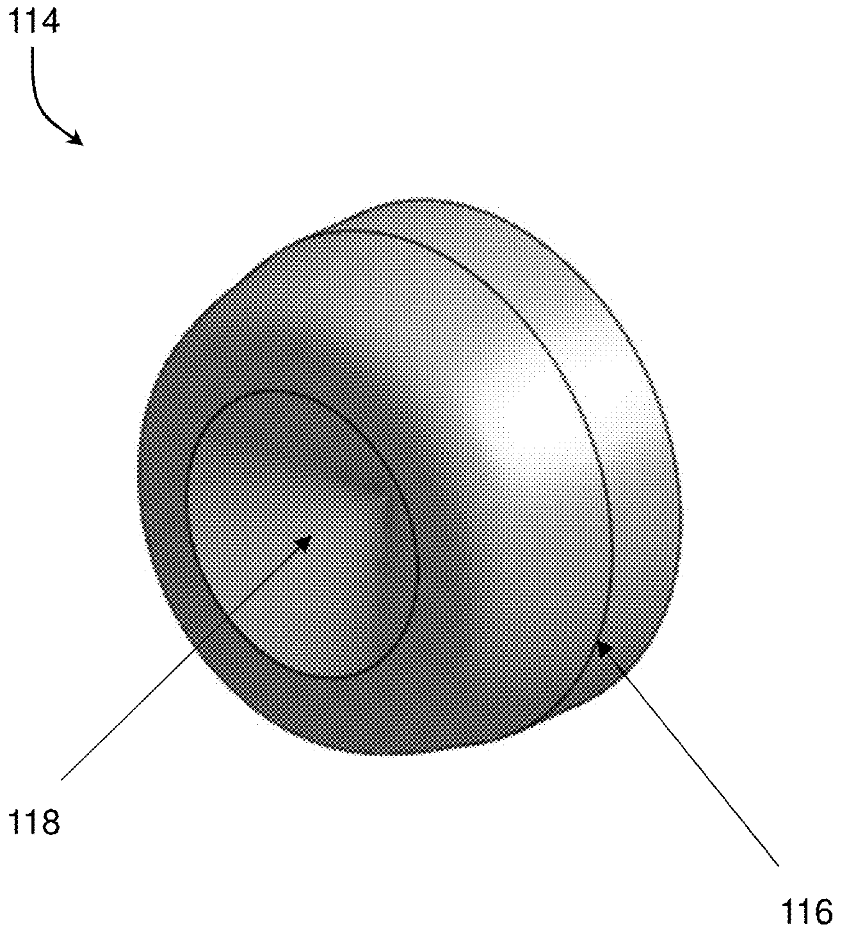
FIG. 4 depicts the weighted head in isolation in accordance with embodiments of the present invention.

FIG. 4 shows the weighted head 114 in isolation. Here, the weighted head comprises a cylinder body 116 having a concave end 118 facing away from the eye 102. The weighted head 114 of the present invention addresses the limitation of previous devices in closely replicating the behavior and movement patterns of bottom-feeding live bait fish. The concave weighted head 114 of the present invention includes unique structural improvements. For example, placing the weight into the nose of the artificial bait of the lure body 200, and a concave shape to the bait nose that dramatically alters an artificial bait movement pattern of the lure 300 in the water and allows the lure 300 to more precisely replicate live bait motion, thereby greatly improving the effectiveness and number of fish strikes achieved.

The eyes of fish contain sensory cells in the retina to form detailed images, including some level of color vision for most freshwater and saltwater species. Fish eyes are merely receptors, so the fish's brain must then interpret these images. The fish brain takes in input information on movement, shape, color, et al., then creates a composite image that informs the brain of possible actions. Fight-or-flight actions then enable the fish to move closer to inspect potential prey, ignore moving plants or stationary rocks, or flee from a larger predator. Small bait fish, crayfish, eels, leeches, and various types of corydalidae spend much of their time foraging on lake and sea beds, displacing the bottom in search of food, or moving on the lake or sea bed. The concave end 118 of the weighted head 114 of the present invention creates a pressure differential at the point of contact with the lake or sea bottom that acts to dispel bottom materials from lake or sea bed to better mimic these bait species bottom feeding actions and create a sensory input trigger in the mind of the predator fish to take action to strike the lure 300.

The weighted head 114 may be formed of metal, plastic, a composite material, or a combination thereof. For example, the weighted head 114 may comprise a plastic body formed around a lead or other suitably heavy material. The weighted head 114 can be disposed on the first shank by being formed over the "J" bend 108 at the distal end of the first shank 104 opposite the eye 102. Alternately, the weighted head 114 can be removably attached to the first shank 104, allowing for the weight, shape, movement characteristics, and materials of the lure 300 to be changed by changing the weighted head 114. Other possible configurations will be apparent to one skilled in the art, given the benefit of this disclosure.

Figure 5:
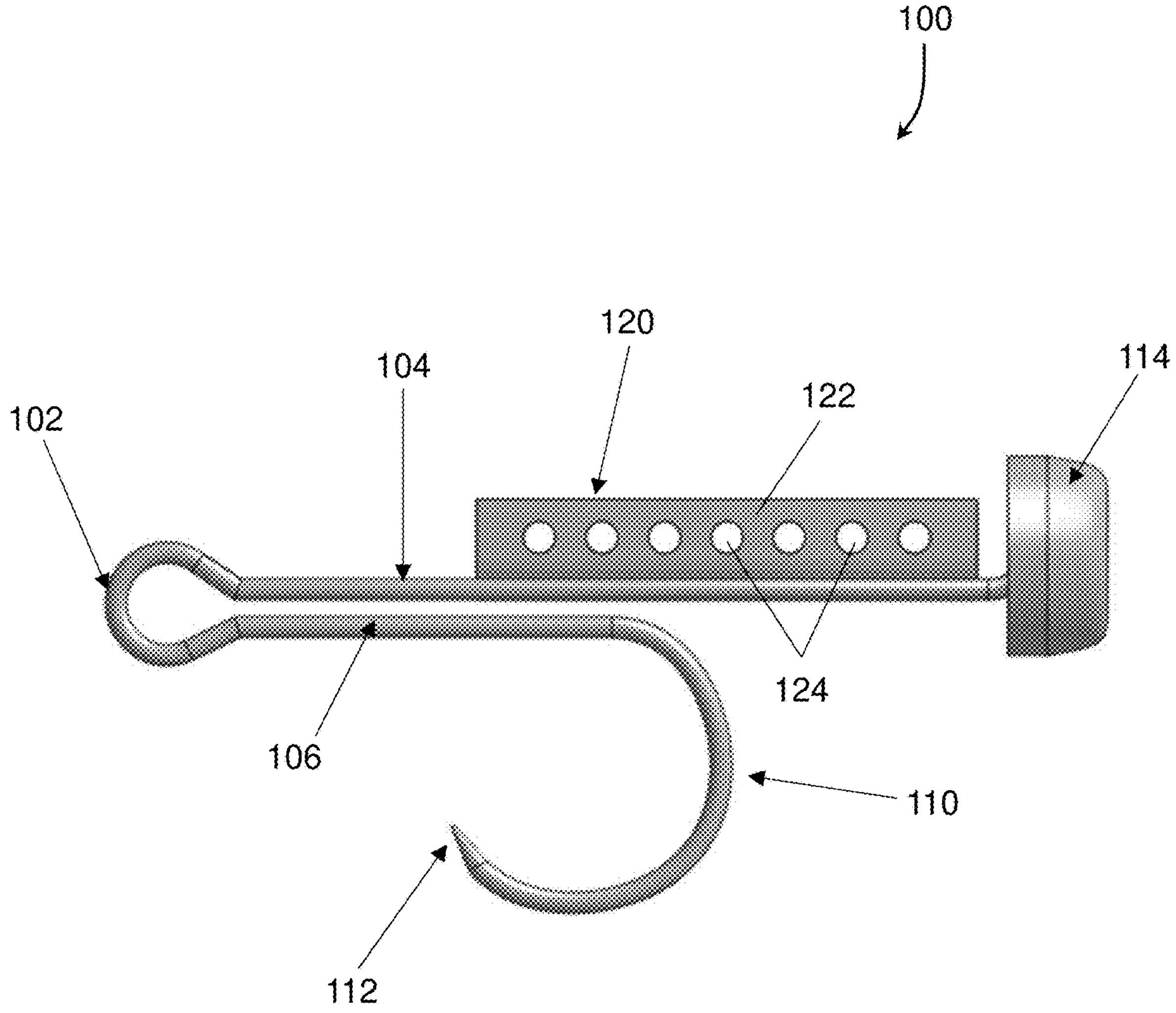
FIG. 5 depicts the hook assembly of the lure with a weighted head and attachment feature disposed thereon in accordance with embodiments of the present invention.

FIG. 5 shows an attachment feature 120 disposed on the first shank 104 between the weighted head 114 and the eye 102. Here, the attachment feature 120 comprises a tab 122 having one or more openings 124 disposed therein or therethrough. The soft nature of lure bodies designed to resemble worms, fish, crustaceans, etc., means that the lure bodies tend to become unhooked from the traditional fishing hook or become damaged when encountering a fish strike. The attachment feature 120 of the present invention acts as a retention device. The openings 124 in tab 122 of the attachment feature 120 allow a molded soft plastic material of the lure body 200 to flow into the attachment device, allowing for improved structural integrity of the lure 300 formed of the hook assembly 100 and lure body 200. The molded soft plastic material described herein can be implemented in a number of different ways as would be understood by those of skill in the art, including but not limited to thermoplastic rubber (TPR).

The attachment feature 120 may be formed as part of the first shank 104 or attached to the first shank 104. In some embodiments, the attachment feature 120 may be welded, fused, glued, or otherwise mechanically attached to the first shank 104. The shape, dimensions, and configuration, including the tab 122 and openings 124 of the attachment features, may be varied or changed as needed for a particular use or application. Other possible configurations will be apparent to one skilled in the art, given the benefit of this disclosure.

Figure 6:
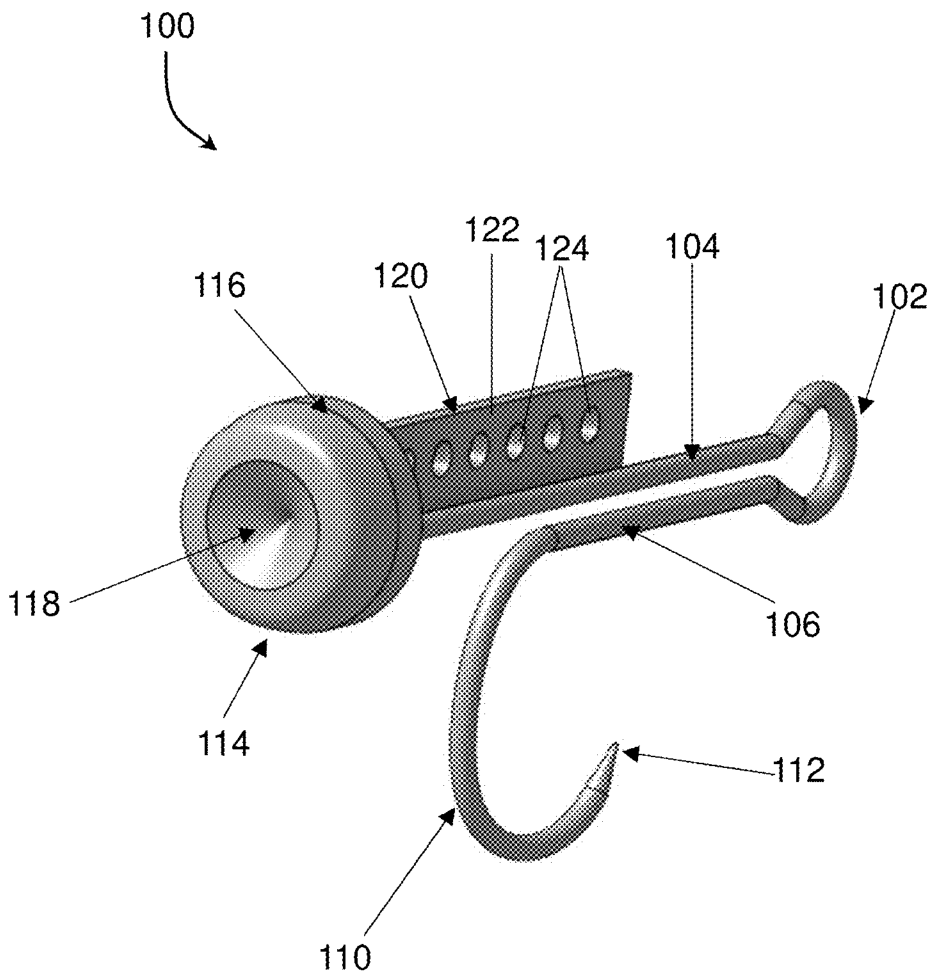
FIG. 6 depicts another perspective of the hook assembly of the lure with a weighted head and attachment feature disposed thereon in accordance with embodiments of the present invention.

FIG. 6 shows a perspective view of a fully assembled hook assembly 100 with both the weighted head 114 and attachment feature 120 disposed on the first shank 104 of the hook assembly 100.

Figure 7:
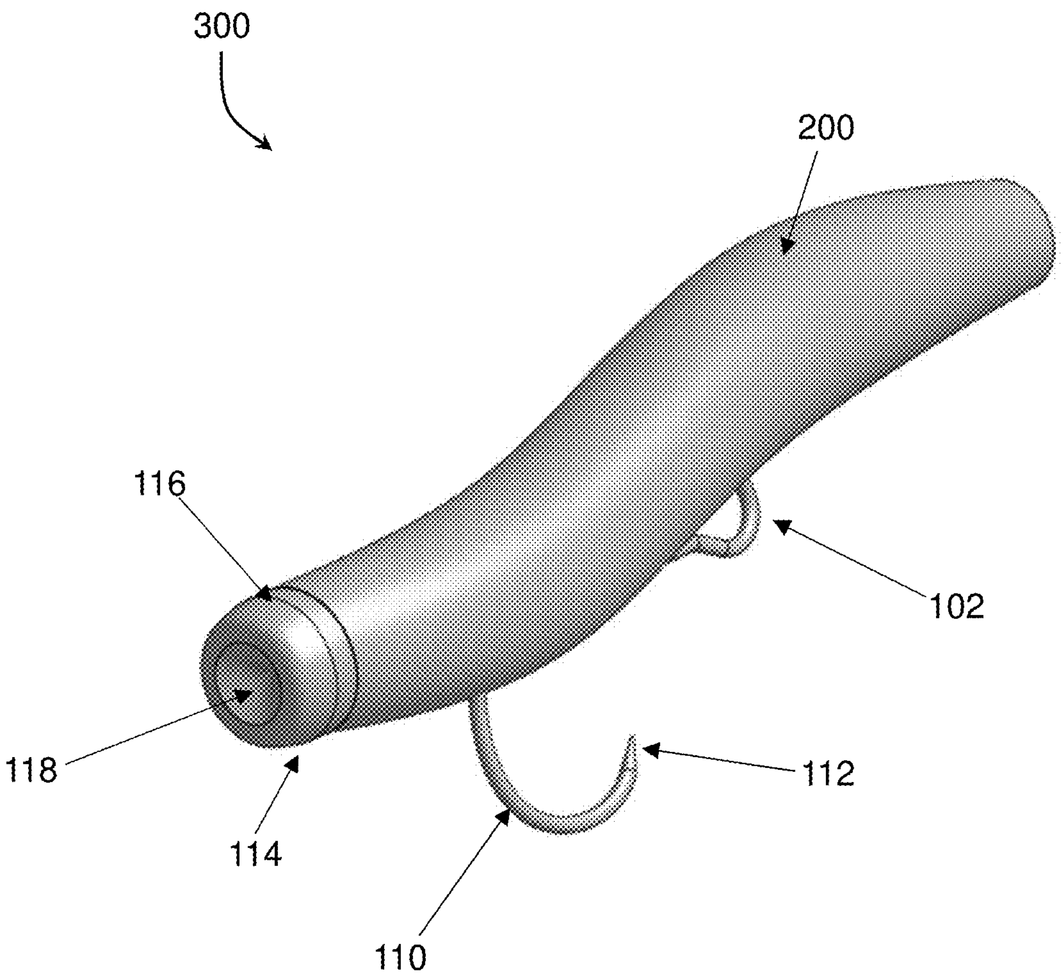
FIG. 7 depicts the lure body disposed on the hook assembly in accordance with embodiments of the present invention.
Figure 8:
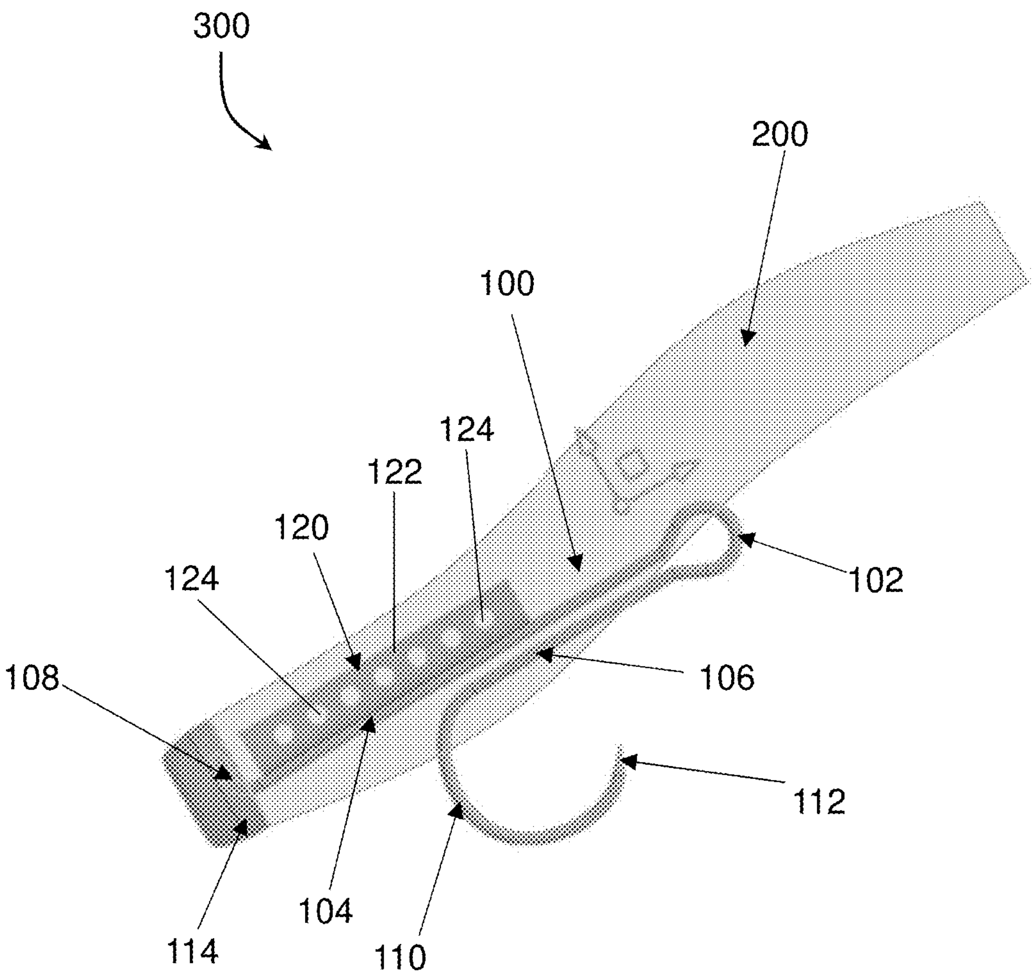
FIG. 8 depicts a transparent view of the lure body disposed on the hook assembly in accordance with embodiments of the present invention.

FIG. 7 and FIG. 8 show a lure body 200 disposed over the hook assembly 100 and attached to the attachment feature 120 of the hook assembly 100. FIG. 7 depicts the full lure 300 formed by the lure body 200 disposed over the hook assembly 100. FIG. 8 is a transparent view showing the position and interaction of the eye 102, first shank 104, second shank 106, bend 110 ending in a barbed point 112, weighted head 114, and attachment feature 120 of the hook assembly 100 in relation to the lure body 200. As seen here in both FIG. 7 and FIG. 8, the eye 102 and the bend 110 ending in a barbed point 112 of the hook assembly 100 extend beyond the lure body 200, and the barbed point 112 is directed away from the weighted head 114 and toward the eye 102.

In FIG. 8 further shows the weighted head 114 formed around or otherwise attached to the "J" bend 108 at the distal end of the first shank 104 opposite the eye 102 and how the lure body 200 is formed around the hook assembly 100 wherein the material of the lure body 200 passes into and through the one or more openings 124 in the tab 122 of the attachment feature 120 securing or otherwise attaching the lure body 200 to the hook assembly 100.

The lure body 200 is designed to cover the hook assembly 100, providing a realistic appearance that mimics natural prey. This is achieved through the use of a molded soft plastic body, which offers a soft, flexible, and realistic feel. The lure body 200 is shaped to resemble bait, which can include one or more of a worm, fish, crustacean, reptile, and insect, thereby targeting different species of fish or matching local prey. The openings 124 in the attachment feature 120 play a role in the structural integrity of the lure. These openings 124 allow the molded soft plastic material of the lure body 200 to flow into and through the attachment device, creating a stronger bond between the lure body 200 and the hook assembly 100. This improved structural integrity ensures that the lure body 200 remains securely attached to the hook assembly 100, preventing it from slipping off during use.

The hook assembly 100 and lure body 200 work together to create a fishing lure 300 that is both realistic and structurally sound. The lure body 200 mimics natural prey while the weighted head 114 and the orientation of the barbed point 112 are designed to enhance the performance of the lure, making it more effective in attracting and catching fish. The weighted head 114 with its concave end is designed to replicate the behaviour and movement patterns of bottom-feeding live bait fish. The weighted head comprises a cylinder body 116 with a concave end 118, which is specifically designed to imitate the burrowing feeding action of small bait fish as they dig the lake or sea bottom for forage. This design is intended to attract predatory fish by closely mimicking the natural behavior of their prey. The barbed point 112 is oriented to point away from the weighted head 114 and toward the eye 102 and surface of the water to reduce snagging to place the barbed point in a better position to snag or catch fish. As detailed in FIG. 7 and FIG. 8 the proximal end of the soft plastic lure body 200 is offset, but co-planar to the distal end of the lure 300. This offset body 200 design promotes oscillation or wiggling in the lure body, similar to the moving tail of a swimming fish, or the whole body movement of eels, leeches, and various types of corydalidae. The shape of the soft plastic body 200 also promotes the wobbling effect of a wounded baitfish when the lure is vertically jigged from the lake or sea bed. When jigged vertically, the design provides an oscillatory motion about the distal end of the body 200 where the hook eye 102 is projected. Allowing the lure 300 to sink back to the bottom of the lake or sea bed, the distal portion of the lure 300 wriggles in an action replicating a live fish tail, creating an action that promotes the innate kill response in the target fish species.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may, in some instances, depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Unless otherwise noted or defined herein, to the extent directional vocabulary is utilized, the disclosure and figures are described with reference to a conventional three-dimensional Cartesian coordinate axis system of X, Y, and Z, where the Y direction is generally left-right or east-west, the Z direction is generally up-down or north-south on the page, and the X direction is generally in-out, relative to the plane of the page of the document. Further, as utilized herein, the terms "horizontal" and "vertical" are utilized consistent with their conventional definitions as would be appreciated by those of skill in the art, and as generally illustrated and expanded upon below. For example, in the fields of physics, engineering, and construction, the direction designated as vertical is usually that along which a plumb bob hangs in response to the force of gravity. The direction of horizontal is considered along a line or plane that is normal or orthogonal to the vertical plane. As such, moving in a horizontal direction (horizontally) is effectively equivalent to traveling across the earth's surface, e.g., moving forward, backward, left, right, etc., along the ground, while moving in a vertical direction (vertically) is effectively equivalent to moving up (away from the ground) or down (toward or into the ground). Merging the X, Y, Z coordinate access with the terms vertical and horizontal, the Y-axis lies in the horizontal direction (left-right on the page), the Z-axis lies in the vertical direction (up-down on the page), and the X-axis is orthogonal to the page (in-out relative to the page). To the extent any ambiguity is generated by the specific wording of the above explanations, it is anticipated that such ambiguity may be interpreted and clarified consistent with the conventional interpretations of the terms horizontal and vertical.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification, embodiments have been described in a way that enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A fishing lure for jigging comprising:
- a hook assembly comprising:
  - an eye;
  - a first shank extending from the eye;
  - a weighted head disposed on the first shank opposite the eye, the weighted head comprising a cylinder body having a concave end facing away from the eye;
  - an attachment feature disposed on the first shank between the weighted head and the eye;
  - a second shank extending from the eye parallel to the first shank; and
  - a bend ending in a barbed point disposed on the second shank opposite the eye between the eye and the weighted head wherein the barbed point is directed away from the weighted head and toward the eye; and
- a lure body disposed over the hook assembly and attached to the attachment feature of the hook assembly;
- wherein the eye and the bend ending in a barbed point of the hook assembly extend beyond the lure body; and
- wherein the weighted head is configured to replicate the behavior and movement patterns of bottom-feeding live bait fish when the fishing lure is vertically jigged from a lake or sea bed.

2. The fishing lure of claim 1, wherein the first shank, the eye, the second shank, and the bend ending in a barbed point are formed as one piece.

3. The fishing lure of claim 1, wherein one or more of the first shank, the eye, the second shank, and the bend ending in a barbed point are formed of metal or composite material.

4. The fishing lure of claim 1, wherein the weighted head is formed of metal, plastic, or composite material.

5. The fishing lure of claim 1, wherein the weighted head is attached at a "J" bend at an end of the first shank opposite the eye.

6. The fishing lure of claim 1, wherein the weighted head is removably attached to an end of the first shank opposite of the eye.

7. The fishing lure of claim 1, wherein the attachment feature is formed as part of the first shank.

8. The fishing lure of claim 1, wherein the attachment feature comprises a tab having one or more openings disposed therethrough.

9. The fishing lure of claim 1, wherein the lure body comprises a molded soft plastic body.

10. The fishing lure of claim 9, wherein the lure body is shaped to resemble bait.

11. The fishing lure of claim 1, wherein the lure body is formed over the hook assembly and into the attachment feature of the hook assembly.

* * * * *